Jan. 15, 1929. 1,698,724
E. A. JOHNSTON ET AL
STUBBLE SHREDDER
Filed April 26, 1926 3 Sheets-Sheet 2
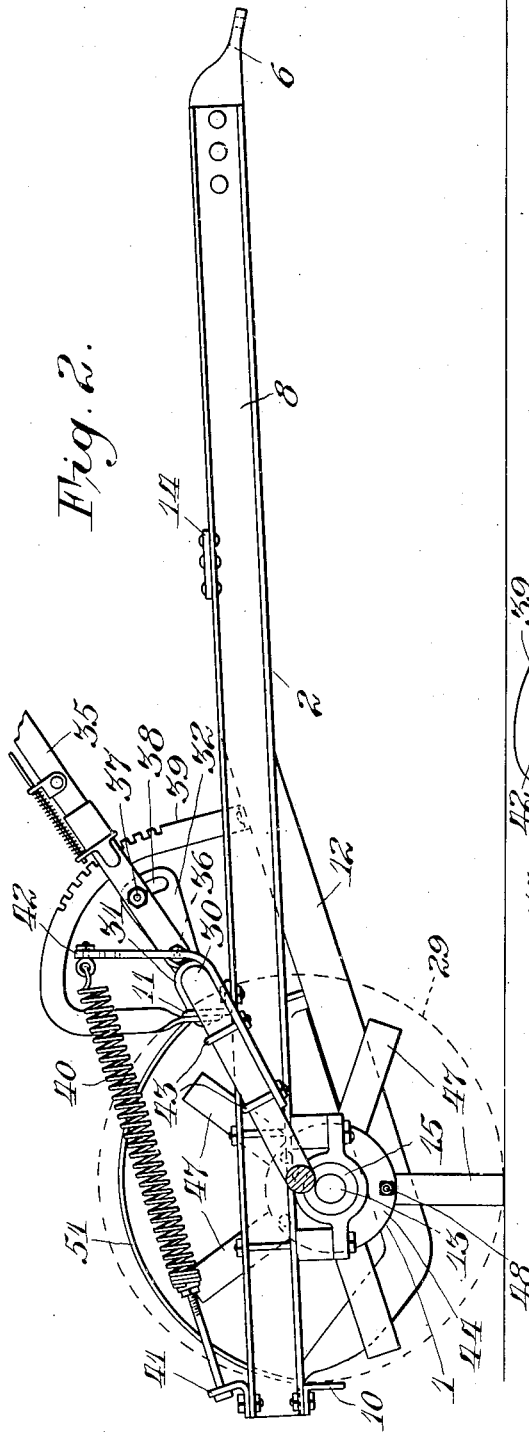
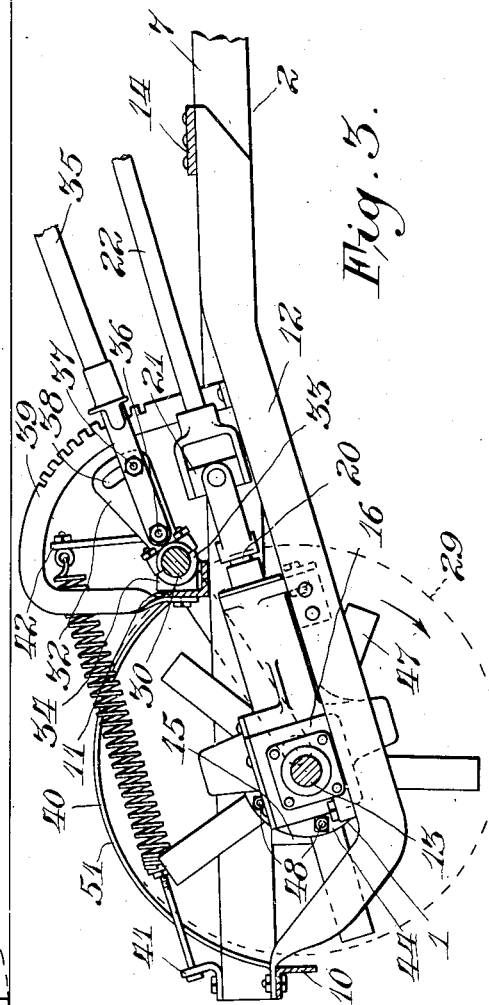
Inventors.
Edward A. Johnston
Bert R. Benjamin
and George M. Merwin,
By [signature]
Atty.

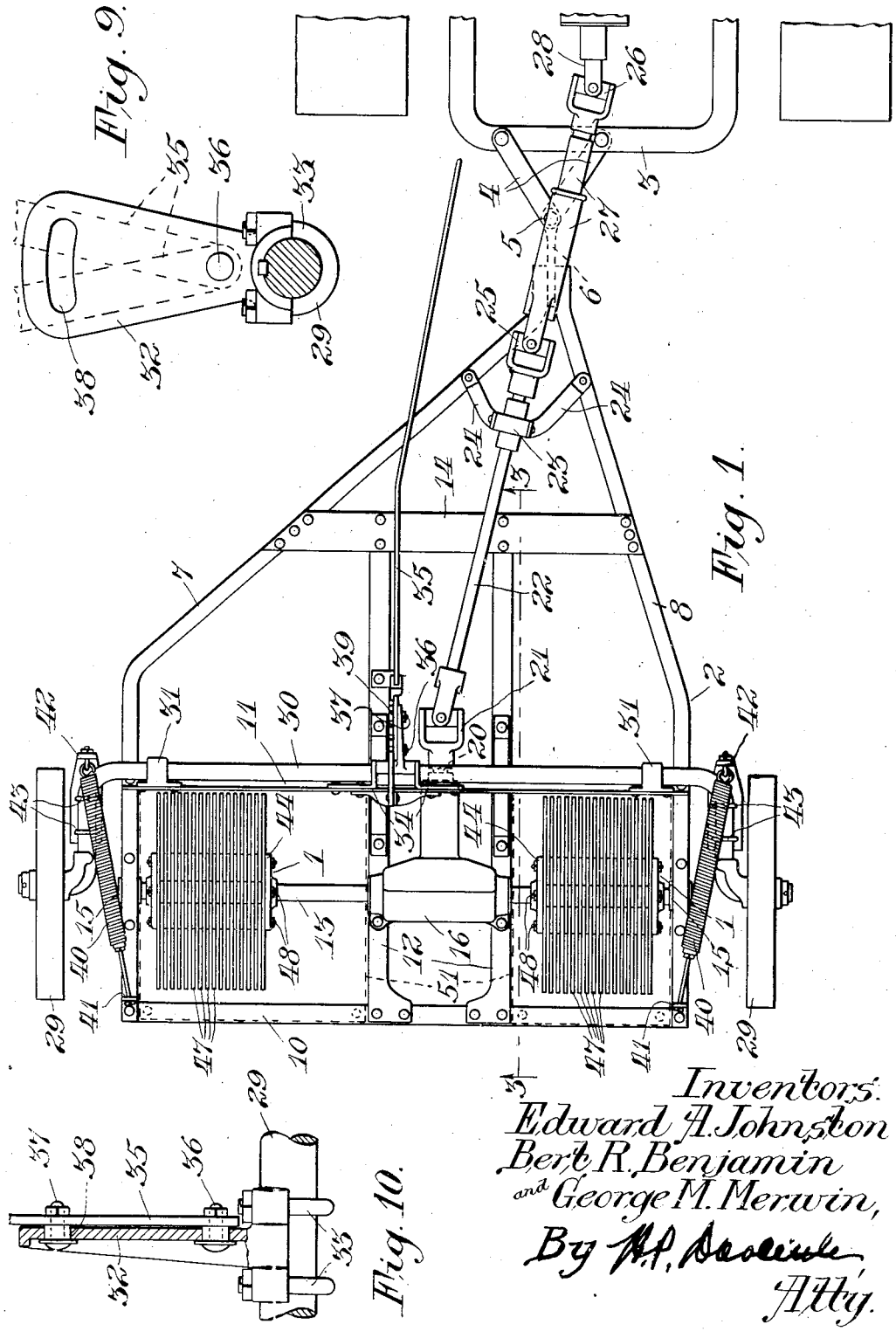

Jan. 15, 1929.   1,698,724
E. A. JOHNSTON ET AL
STUBBLE SHREDDER
Filed April 26, 1926   3 Sheets-Sheet 3
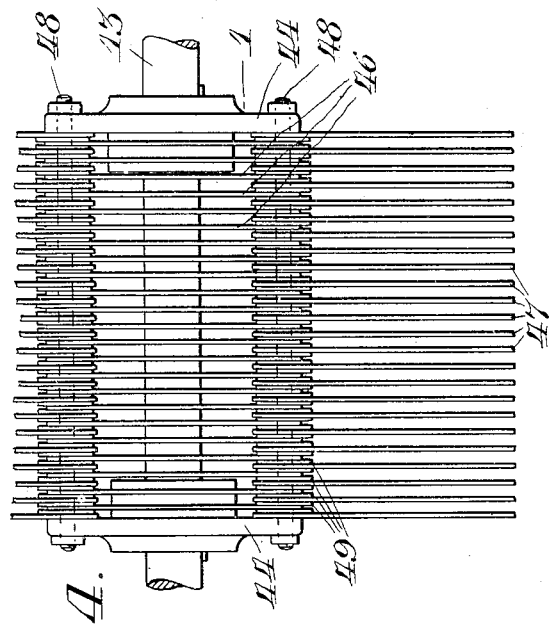
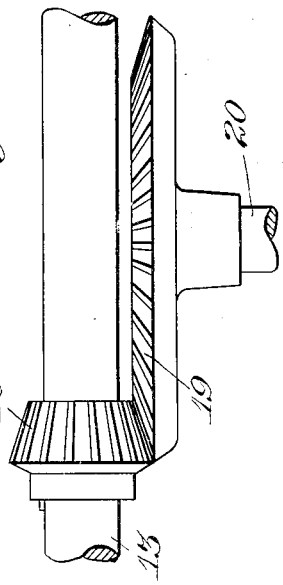
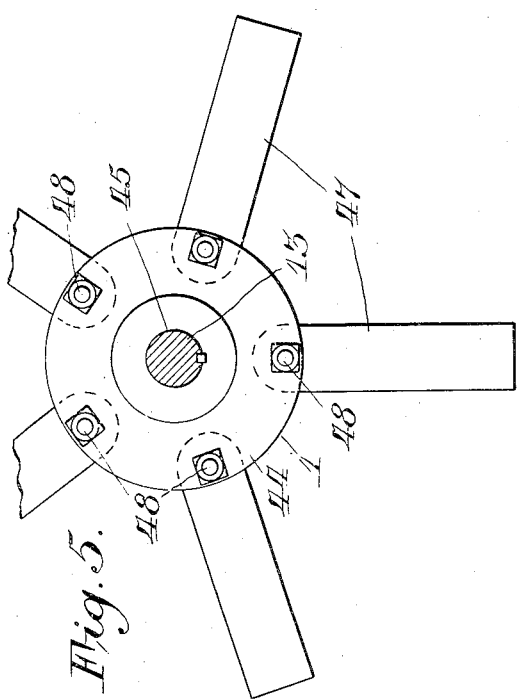
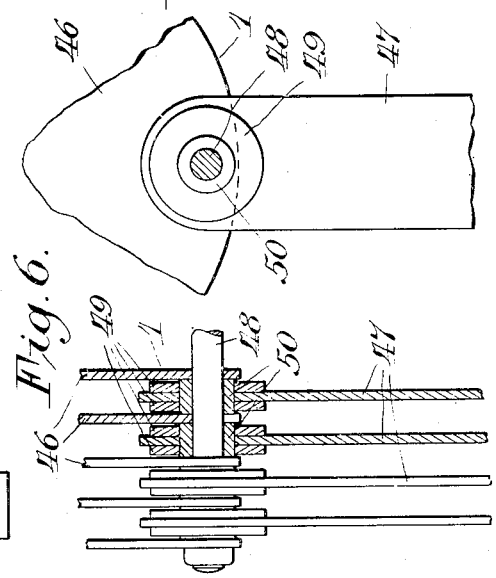
Inventors.
Edward A. Johnston
Bert R. Benjamin
and George M. Merwin,
By W. P. Doolittle
Atty.

Patented Jan. 15, 1929.

1,698,724

UNITED STATES PATENT OFFICE.

EDWARD A. JOHNSTON, OF CHICAGO, BERT R. BENJAMIN, OF OAK PARK, AND GEORGE M. MERWIN, OF BERWYN, ILLINOIS, ASSIGNORS TO INTERNATIONAL HARVESTER COMPANY, OF CHICAGO, ILLINOIS, A CORPORATION OF NEW JERSEY.

STUBBLE SHREDDER.

Application filed April 26, 1926. Serial No. 104,583.

This invention relates to implements for breaking up and shredding stubble and stalks in the field and for pulverizing the soil.

In certain sections of the country crops are ravaged and fields are substantially devastated by pests which eat their way through the plant stalks, causing the plants to be so injured and weakened that they cannot have a normal growth. A pest of this character known as the European corn borer, has been increasingly active in certain sections of the country devoted extensively to the raising of corn. This pest bores and tunnels through the stalk, even reaching the ears of corn and eating away enough of the ear to cause the entire corn crop of a large region to be a complete failure.

The tunneling of the corn borers within the plant stalks is so extensive that it commonly reaches down to the roots, and, as parts of corn stalks are ordinarily left in the field as stubble after the harvesting of the corn, sufficient sustenance is provided to enable the pest to live in the field from the time of harvest until the time of the succeeding planting. It is now proposed to thoroughly cut and shred all plant stalks and stubble left in the field after the harvest, so that this pest may be destroyed, and this invention is intended to provide an effective means for operating upon a field to produce this result.

After the stubble and plant stalks in the field have been thoroughly broken up and shredded, the bits of stalk and stubble are to be gathered and then burned so as to insure the destruction of all plant parts infested with the pest.

An embodiment of the invention is shown in the accompanying drawings, in which—

Figure 1 is a plan view of the stubble shredder showing the manner in which it is secured to and driven by a tractor;

Figure 2 is a vertical elevation of the means with one of its supporting wheels removed;

Figure 3 is a vertical section on the line 3—3 of Figure 1;

Figure 4 is a partial elevation showing a cutter head;

Figure 5 is a partial vertical end elevation of the cutter head;

Figure 6 is a detail view showing the mounting of the rotating blades in the cutter head;

Figure 7 is a detail view in elevation of the elements shown in Figure 6;

Figure 8 is a view showing the gearing for driving the cutter heads;

Figure 9 is an elevation showing the slotted sector which permits the cutter heads to have limited floating movement as the machine traverses the field; and Figure 10 is partly a sectional view and partly an elevation of the slotted segment shown in Figure 9.

The illustrative stubble shredder includes cutter heads 1, which are rotatably mounted upon a main frame 2 adapted to be directly attached to a tractor, as shown in Figure 1. The cutter heads 1 are adapted to be rotated at high speed by means of power transmitting connections operatively secured to the power take-off of a tractor, and the main frame is provided with a depth regulator for governing the vertical position of the cutter heads.

In the present instance two spaced cutter heads are so carried by the main frame that two rows of plant stubble may be broken up and shredded at the same time. It is desirable that the cutter heads operate upon the plant stalks and stubble while the latter are in the condition in which they are left by the harvesting, and for this reason the main frame 2 of the illustrative stubble shredder is secured to the tractor drawbar 3 so that the tractor wheels may straddle a row of stubble, one cutter head being positioned so as to act upon that row while the other cutter head acts upon a row of stubble at the side of the tractor. For adequately effecting such an arrangement the tractor drawbar 3 has draft links 4 secured near one end. These draft links converge rearwardly to a point where they are secured by a draft pin 5 to the clevis bar 6 of the shredder main frame.

On account of the excessive speed at which the stubble shredder must operate, it must be rigidly and solidly supported to endure the shocks and strains caused by the operation of the rapidly moving cutter heads upon plant stubble and other obstructions. Adequate support is given to the cutter heads by the illustrative main frame, which is formed of heavy channel and angle bars. The side rails 7 and 8 are appropriately arranged in forwardly converging relation in front of the cutter heads, the forward ends of these bars being secured to the clevis bar 6. The rear portions of the side rails are connected by angle bars 10 and 11, forming a substantially rectangular framework within which the cutter heads are located.

The central portion of the main frame is strengthened by the addition thereto of two downwardly bent parallel bars 12. These parallel bars are riveted at their rear ends to the rear cross bar 10 and are secured at their forward ends to an extra heavy cross bar 14 supported by and secured to the converging portions of the side bars.

The cutter heads 1 are fixed to a driven shaft 13 which is shown as extending from one side of the frame to the other. This shaft is journaled at its ends in bearings 15 secured to the side rails 7 and 8. The central portion of the shaft is journaled within the gear casing 16 bolted at its ends to the bent parallel bars 12, as particularly well shown in Figures 1 and 3.

A power transmission apparatus for driving the cutter heads includes a pinion 18 which is fixed to the driven shaft within the gear casing 16. High speed rotation of the driven shaft and its accompanying cutter heads is caused by the provision of a large bevel gear 19 meshing with the pinion 18 within the gear casing 16. This bevel gear is fixed to a short propeller shaft 20 having a universal joint construction 21 operatively connecting its forward end to a second propeller shaft 22 mounted within a bearing 23 secured to the forward end of the main frame by means of braces 24. Other universal joints 25 and 26 and a sliding sleeve and shaft construction 27 connect the second propeller shaft to the power take-off shaft 28 of the tractor.

The main frame is supported by ground wheels 29 journaled upon the ends of a crank axle 30, which in turn is journaled in brackets 31 secured to the cross bar 11, as shown in Figure 1. It is by the movement of this crank axle relative to the main frame that the vertical position of the cutter heads is governed, and a depth regulator provided for the machine.

As shown, the crank axle 30 has a slotted segmental bracket 32 secured to its midportion by U-bolts 33. Lengthwise shifting of the crank axle is prevented by angle brackets 34 which closely fit against that part of the segmental bracket, formed as a half sleeve around the crank axle. A depth regulator and frame adjusting lever 35 is shown pivoted to the segmental bracket at 36. This lever carries a pin 37 operating in the slot 38, which is formed on an arc, the center of which is the pivot of the lever.

For holding the lever in its adjusted position, a detent bracket, or ratchet, 39 is fixedly secured to the frame work, as shown.

It will be evident from the above description that means is provided for regulating the vertical positions of the cutter heads in such a manner that they may have a limited range of movement at any given position of the adjusting lever, by reason of the slot and pin connections between the lever 35 and the segmental bracket 32. This structure is of particular advantage on account of the obstructions encountered by the machine and the roughness of the surface traversed.

The operation of the machine is further improved, and the up and down movement of the cutter heads for any given position of the adjusting lever 35 are resiliently governed by counterbalancing springs 40. These springs are interposed between the ends of the crank axle 30 and fixed parts of the machine. As shown, the rear ends of the counterbalancing springs are anchored at 41 to the rear corners of the frame. At their forward ends they are adjustably secured to the upper ends of brackets 42, which are shown secured to the lugs of the crank axle 30 by means of U-bolts 43.

Each cutter head comprises a pair of flanged hubs 44 which are keyed to the driven shaft in spaced relationship, as indicated in Figure 4 of the drawings. These hubs are provided with circumferentially arranged openings 45. Spacing disks 46 having similarly arranged openings are located between the flanged hubs. Between each pair of spacing disks a series of the cutter heads 47 are arranged. These cutter blades are rotatably mounted upon sleeves which in turn are rotatably mounted upon arbor bolts 48 passing through the aligned openings of all of the spacing disks and the flanged hubs. Each cutting blade is held in properly spaced relationship to the disks 46 by means of washers 49 rotatably fitted upon the sleeves 50, as shown. With the construction of cutter head described the cutter blades assume approximately radial positions while the driven shaft is being rotated at high speed, but are pivotally mounted so that there will be no breakage of parts in case extraordinary obstructions are encountered.

Complete breaking up of all stalk and stubble is promoted by a substantially semi-circular fender 51 secured to the cross bars 10 and 11 above each cutter head. These fenders, or guards, also prevent promiscuous scattering of the shredded material.

While one particular embodiment of the invention has been disclosed and described herein, it will be understood that variations of that embodiment may be made in accordance with the demand of different circumstances under which the machine may be operated, within the scope of the appended claims.

Having described our invention, we claim:

1. A stalk shredder comprising a power driven rotary cutter head adjustable to and from the ground, a driven shaft upon which the cutter head is non-rotatively mounted, a main frame in which the driven shaft is journaled, ground wheels, a crank axle connecting said ground wheels and journaled on said main frame, a depth regulator for angularly adjusting said crank axle relative to said main frame for changing the vertical position of said cutter head, a lost motion connection incorporated in said depth regulator so as to allow the main frame to have limited floating movement at any position of adjustment of said depth regulator, counter-balancing springs for normally tending to elevate said main frame, and means for rotating the cutter head.

2. An implement of the class described comprisng, in combination, a frame, transport supports for said frame, a crank axle journaled on said frame and extending transversely thereof with its ends supported by and rotatively mounted on said transport supports, a transverse shaft rotatably journaled transversely of said frame, a cutter head fixed upon said shaft to be rotated thereby, gearing and other power transmitting connections carried by said frame and arranged to transmit said power to said shaft to rotate said cutter head, manually operable means for turning said crank axle to change the position at which the cutter head operates and for normally holding the cutter head in a desired position, said means including a hand lever and a lost motion connection for permitting the frame to move downwardly relative to the transport supports when abnormal conditions are encountered in the operation of the implement, and a counter-balancing spring anchored at one end to the frame and connected at its other end to the crank axle so that it normally tends to maintain the frame and the cutter head at their high position determined by the position of said manually operable means and by the limits imposed by said lost motion connection.

3. A stubble shredder comprising, in combination, a transport frame having its forward parts forwardly convergent, a draft appliance secured to said frame at its forward end, a shaft journaled transversely of the frame, a cutter head fixedly mounted on said shaft so as to be driven thereby, gearing for trasmitting rotary movement to said shaft, a gear casing housing said gearing and supported by the frame, power transmitting shafts and connections rotatively mounted on the frame and adapted to transmit power from the power take-off of a tractor to said gearing, a crank shaft journaled transversely of the frame, transport supports supporting the crank shaft at its ends, adjusting mechanism for turning the crank shaft to raise and lower the frame and cutter head, a radial arm fixed to the crank shaft and constituting a part of said adjusting mechanism, the upper end of said radial arm being formed with an arcuate slot, a hand lever pivoted on said radial arm and carrying a projection operable through said slot, a detent bracket secured to the frame, detent mechanism carried by the lever and cooperating with said bracket to hold the adjusting mechanism in any desired position, a crank arm fixed to said crank shaft, and a counter-balancing spring anchored at one end to the frame and secured at its other end to the crank arm.

In testimony whereof we affix our signatures.

EDWARD A. JOHNSTON.
BERT R. BENJAMIN.
GEORGE M. MERWIN.